United States Patent [19]

Ishiguro et al.

[11] 3,950,453

[45] Apr. 13, 1976

[54] PROCESS FOR PREPARING PETROLEUM RESINS

[75] Inventors: Minoru Ishiguro; Yuzo Takeuchi; Shozo Shiozaki, all of Kawasaki, Japan

[73] Assignee: Nippon Zeon Co., Ltd., Tokyo, Japan

[22] Filed: June 13, 1974

[21] Appl. No.: 478,995

[30] Foreign Application Priority Data

June 25, 1973  Japan.................................. 48-71566

[52] U.S. Cl............ 260/878 B; 260/82; 260/85.3 R; 260/879; 260/880 B
[51] Int. Cl.$^2$................. C08F 297/00; C08F 240/00
[58] Field of Search ............ 260/878 B, 879, 880 B, 260/82, 85.3 R

[56] References Cited
UNITED STATES PATENTS

| | | | |
|---|---|---|---|
| 3,297,793 | 1/1967 | Dollinger.......................... | 260/880 B |
| 3,356,763 | 12/1967 | Dollinger et al..................... | 260/879 |
| 3,639,517 | 2/1972 | Kitchen et al...................... | 260/879 |
| 3,639,521 | 2/1972 | Hsieh.............................. | 260/880 B |
| 3,707,520 | 12/1972 | Pampus et al..................... | 260/878 B |
| 3,825,624 | 7/1974 | Hirai et al........................... | 260/879 |
| 3,855,187 | 12/1974 | Winkler et al........................ | 260/82 |

*Primary Examiner*—Alan Holler
*Attorney, Agent, or Firm*—Frank J. Jordan

[57] ABSTRACT

A process for preparing petroleum resins having a low melt viscosity and satisfactory compatibility, characterized by firstly polymerizing a first feed portion comprising at least one chain conjugated diolefin having 4 to 5 carbon atoms and at least one monoolefinic unsaturated hydrocarbon having 4 to 10 carbon atoms in a proportion of 20 – 80 percent by weight of the monomers contained in the first feed portion and secondly polymerizing a second feed portion comprising at least one such chain conjugated diolefin and, if desired, at least one such monoolefinic unsaturated hydrocarbon, the first and second polymerizations being successively conducted in the presence of a Friedel-Crafts type catalyst in a polymerization reactor or reactors connected in series to each other.

15 Claims, No Drawings

PROCESS FOR PREPARING PETROLEUM RESINS

This invention relates to a process for the preparation of a petroleum resin having a low melt viscosity and satisfactory compatibility. More particularly it relates to a process for the preparation of a petroleum resin containing a relatively large proportion of the units derived from conjugated diolefins and having such desirable properties as above by subjecting to polymerization one after another two substantially monomeric feed portions which are different from each other in content of conjugated diolefins and the like, without polymerizing the two feed portions in admixture (that is, polymerizing a starting oil composition composed of the two feed portions) in a conventional manner. The total of such monomeric feed portions, is defined to be a "starting oil composition" throughout the specification although they are fed not in admixture but separately one after another according to this invention.

Generally, conventional petroleum resins are obtained by polymerizing a cracked oil fraction boiling at temperatures of −7° to +280°C in the presence of a Friedel-Crafts type metal halide or its oxygen-containing complex compound as a catalyst, terminating the polymerization by neutralization of the resulting reaction mixture, separating the used catalyst from the reaction mixture and then removing the unreacted portion of the oil, the solvent if used and the oily products of low polymerization degree by distillation or steam distillation under atmospheric or reduced pressure.

The polymerizable components contained in the cracked oil fraction having said boiling point range, include chain monoolefins such as butenes and pentenes; cyclic monoolefins such as cyclopentene and cyclohexene; conjugated chain diolefins such as butadiene, 1,3-pentadiene and isoprene; conjugated cyclic diolefins such as cyclopentadiene and other olefinic compounds such as styrene, alkylstyrenes, indene, alkylindenes and dicyclopentadiene.

If such a cracked oil fraction as above, each of the sub-fractions obtained by the isolation and purification thereof, or a combination of at least two of these sub-fractions, contains a large proportion of conjugated diolefins and is used as a raw material or a starting oil composition in the polymerization, the starting oil composition will give a solvent-insoluble gel-like material as a by-product thereby not only rendering removal of the used catalyst remarkably difficult but also having adverse effects on various uses of the thus-obtained petroleum resins since the gel-like material is incorporated therein. On the other hand, if chain monoolefins having 4 – 10 carbon atoms or cyclic monoolefins having 5 – 6 carbon atoms are attempted to be polymerized in the presence of Friedel-Crafts type metal halide as a catalyst, they will not be polymerized singly or will only give oily products of a limited commercial value. In addition, if α-methylstyrene is attempted to be singly polymerized using a Friedel-Crafts type metal halide as a catalyst, it will not give polymers which are stable at high temperatures without depolymerization. Thus, there have been developed some processes for the preparation of industrially useful petroleum resins by copolymerizing a conjugated diolefin, which will not be polymerized without the formation of gel-like material as a by-product if used singly in the presence of a Friedel-Crafts type metal halide, with a suitable monoolefin while inhibiting the formation of the gel-like material. Typical of these developed processes are a process for copolymerizing 1,3-pentadiene with 2-methyl-2-butene (Japanese Pat. Gazette 12306/70), a process for copolymerizing 1,3-pentadiene, 1,3-butadiene, 2-ethyl-1-butene and 2-methyl-2-butene with each other (Japanese Patent Laying-Open Gazette 1991/72), and the like. However, the presence of a large proportion of monoolefins in the starting oil composition will result in that the amount of oily products formed as a by-product is increased, the yield of resinous products obtained is decreased and the softening point of the thus-obtained resin is low.

Attempts have been made by the present inventors to overcome the above-mentioned drawbacks and find a more improved process and, as a result, there has been found a process for preparing petroleum resins containing a large proportion of the units derived from conjugated diolefins while inhibiting the formation of gel-like material by polymerizing two feed portions from suitable sources one after another without feeding them in admixture like the conventional starting oil composition, the firstly fed portion being required to contain at least certain amount of monoolefins in addition to the diolefins.

The primary object of this invention is to provide a process for the preparation of petroleum resins having a low melt viscosity and good compatibility.

This and other objects, as will hereinafter become more readily apparent, can be attained by the practice of the following process for the preparation of petroleum resins. The process comprises cationically polymerizing in the presence of a Friedel-Crafts type catalyst first and second feed portions one after another, the first feed portion to be firstly fed comprising at least one chain conjugated diolefin having 4 – 5 carbon atoms and at least one monoolefinic unsaturated hydrocarbon having 4 – 10 carbon atoms in a proportion of not lower than 20 percent by weight of the monomers (including said monoolefins) contained in the first feed portion, and the second one comprising at least one such chain conjugated diolefin together with or without at least one such monoolefinic unsaturated hydrocarbon in a less proportion (based on the weight of the monomers contained in the second portion) than said proportion in the first feed portion, thereby to obtain desired petroleum resins having a low melt viscosity and satisfactory compatibility.

In the practice of the two-step polymerization of this invention, the first and second feed portions are respectively fed in the first and second steps of polymerization and they may also be collected in three or more portions from suitable sources although this is not particularly necessary.

According to this invention, if the first feed portion contains monoolefins in amounts equivalent to almost all of those contained in a starting composition which is the total of the two feed portions and, on the other hand, it is not more than a small portion of the starting oil composition, then the content of the monoolefins in the first feed portion is consequently high for the total monomers therein thereby rendering it very effective to inhibit the formation of gel-like materials during polymerization. With the increase in proportion of the first feed portion fed in the first step to the starting oil composition, the effect of inhibiting the formation of gel-like material wil gradually be lessened and the behavior of polymerization will finally come to be approximately the same as shown in the conventional polymerizing process wherein two such feed portions are not separately fed but fed in admixture. However, it will be possible to inhibit the formation of gel-like material as far as the first feed portion to be fed in the first step contains monoolefins in amounts of at least 20 percent by weight.

On the other hand, if the first feed portion to be fed in the first step contains the monoolefins in an unduly large proportion, it will give resinous products having a lowered softening point in a decreased yield. Accordingly, the suitable proportion of the monoolefins to the total monomers present in the first feed portion varies depending on the proportion of the monomers present in the first feed portion to the total monomers present in the first and second feed portions which constitute the starting oil composition. The higher the proportion of the monomers present in the first feed portion to the total monomers present in the starting oil composition is, the lower proportion of the monoolefins to the monomers in the first feed portion may be. This proportion of the monoolefins in the first feed portion should be usually not higher than 80 percent by weight, preferably not higher than 65 percent by weight.

As mentioned before, in the practice of this invention are employed as the monomers chain conjugated diolefins having 4 – 5 carbon atoms and monoolefinic unsaturated hydrocarbons having 4 – 10 carbon atoms and being copolymerizable therewith. Typical of the chain conjugated diolefins are 1,3-pentadiene, isoprene and 1,3-butadiene. Typical of monoolefinic unsaturated hydrocarbons are chain monoolefins such as butene-1, isobutylene, pentene-1, 2-methylbutene-2, hexene-1, 2,4,4-trimethylpentene-1 and 2,4,4-trimethylpentene-2; alicylic monoolefins such as cyclopentene and cyclohexene; and vinyl-substituted aromatic compounds such as styrene and α-methylstyrene. Among these monoolefinic unsaturated hydrocarbons, particularly preferable ones are chain and cyclic monoolefins having 5 carbon atoms, diisobutylene (a mixture of 2,4,4-trimethylpentene-1 and 2,4,4-trimethylpentene -2) and α-methylstyrene. In addition to these monomers, other unsaturated monomers such as cyclopentadiene, dicyclopentadiene, indene, cumarone and terpene, may also be used in such small amounts that they do not hinder the attainment of the object of this invention.

The first and second feed portions or a starting oil composition used herein may be a simple mixture of the monomers, a combination of sub-fractions prepared by suitably purifying and fractionating a fraction of unsaturated hydrocarbons boiling at temperatures in the range of −7° to +280°C produced as a by-product by the cracking or reforming of petroleum fractions, or a combination of said sub-fractions and desired monomers. The total amount of the monoolefins contained in the first and second feed portions should be at least 5 percent, preferably at least 10 percent, by weight based on the total monomers contained in said two feed portions to inhibit the formation of gel-like polymers, while it should be not more than 65 percent, preferably not more than 60 percent, by weight on the same basis as above in order to prevent the production of polymers having a lowered softening point and of oily products as by-products.

In the first and second polymerization steps according to this invention there are respectively used the first and second feed portions which are different in monomeric composition from each other. The first feed portion having a higher content of the monoolefins than the second feed portion varies in content of the monomers depending on the content of the monoolefins contained in the first feed portion; however, it should contain 20 – 80 percent, preferably 30 – 70 percent, by weight of the total monomers contained in the first and second feed portions which constitute the starting oil composition previously defined. In cases where the total amount of the monoolefins among the total monomers contained in the first and second feed portions is constant or fixed, the proportion by weight of the monoolefins to the monomers (the monomers including said monoolefins) in the first feed portion should preferably be at least 5 percent larger than that in the second feed portion since the resulting polymer will have a lower melt viscosity and more satisfactory compatibility with other resins as the difference is increased between the proportion by weight of the monoolefins to the total monomers present in the first feed portion and that in the second feed portion.

The Friedel-Crafts type catalysts which may be used in this invention, typically include the fluoride, chloride, bromide and iodide of such metals as aluminum, boron and iron, and aluminum chloride is particularly preferable as the catalyst. In the practice of polymerizing reaction the catalysts are usually used in a particulate form of 5 – 200 mesh size, preferably 20 – 200 mesh size. The catalyst used is not particularly limited in amount but it should be used in such amounts as to allow the polymerizing reaction to take place satisfactorily. The catalyst is generally suspended in a solvent and the first or second feed portion is gradually added to the catalyst-suspended solvent to allow the reaction to proceed, this procedure being preferable from the view-point of maintaining the reaction temperature at a desired level.

The process of this invention may continuously be conducted, for example, by using two (first and second) polymerization reactors connected to each other, the first reactor in the first step being charged continuously with the catalyst, the first feed portion to be fed in the first step and, if required, a solvent to allow the resulting mixture to polymerize and the second reactor in the second step being charged continuously with the second feed portion oil composition to be fed for polymerization in the second step while allowing the reaction mixture from the reactor in the first step to be continuously passed into the other reactor in the second step, this procedure for continuous operation being recommendable.

The use of a diluent is advantageous in controlling the polymerizing reaction temperature since the reaction is an exothermic one. Solvents which may be used as the diluents, should preferably be inert to the reaction and typically include aromatic hydrocarbons such as benzene, toluene and xylene; aliphatic hydrocarbons such as pentane; hexane and heptane; and alicyclic hydrocarbons such as cyclohexane. In a case where the feed portions contain the conjugated diolefins in large amounts, it is preferable to use a solvent containing not les than 50 percent by weight of aromatic hydrocarbons in order to further ensure the effect of inhibiting the formation of gel-like material. The solvents are usually used in amounts of 20 – 1000 parts, preferably 50 – 500 parts by weight per 100 parts by weight of polymerizable ingredients.

The polymerizing reaction is carried out at temperatures of usually −20° – +100°C, preferably 0° – 80°C, and the pressure within the reaction system may be equal to, higher or lower than, atmospheric pressure. The reaction time is not critical either and may generally vary from several seconds to several hours. The polymeric materials obtained under such operational conditions are treated in the usual manner and then dried.

The softening points of the polymers obtained according to this invention vary depending on the nature or kind of the conjugated diolfefins and monoolefins contained as the principal ingredients in the feed portions from which said polymers were prepared, and they usually vary from 60° to 140°C and may be higher than 140°C in some cases. The polymers are industrially useful resins which are soluble in aliphatic, aromatic or halogenated hydrocarbons. The particular features of the resins obtained according to this invention as compared with those obtained by the conventional polymerization process, are that they have a narrow distribution of molecular weight and therefore a low melt viscosity thereby allowing them to be advantageously used for various purposes. This invention is further advantageous in that the hydrocarbon resins according to this invention are improved in compatibility with ethylene-vinyl acetate copolymers widely used as the principal ingredient for hot melt adhesives and they may therefore be conveniently used in the preparation of such hot melt adhesives.

This invention will be better understood by the following non-limitative examples in which all parts and percentages are by weight unless otherwise indicated.

EXAMPLE 1

A 3-liter glass flask was charged with 1229 g of a mixed solvent consisting of benzene and toluene in the ratio of 80 parts to 20 parts and with 8.2 g of aluminum chloride to form a mixture which was stirred at 45°C for 10 minutes and then incorporated slowly and continuously with two feed portions A and B over a period of 120 minutes. The portions A and B of the hydrocarbon mixture so added respectively had the compositions A and B as indicated in the following Table 1 and totally amounted to 721 g including 682 g of monomers. Said incorporation of the feed portions A and B was effected in such a manner that the portion A having the composition A as indicated in Table 1 and including 50 percent of the total of the monomers in the feed portions was firstly added, followed by adding the portion B which had the composition B as indicated in Table 1 and contained the remaining 50 percent of the total of the monomers in the feed portions. The reaction system was maintained at a temperature of 55°C by cooling while preventing an undue temperature rise of the system due to its exothermic reaction. After completion of the incorporation of the two feed portions, the reaction mixture was further stirred for 30 minutes and then incorporated with 33 ml of a mixture of methanol and a 28 percent ammonia water in equal amounts by volume thereby decomposing the used aluminum chloride. The solid particles produced by the decomposition were filtered out to collect the filtrate which was transferred into a 3-liter glass flask where the filtrate was heated under a stream of nitrogen to distil off the unreacted hydrocarbons and the solvent and was then raised in temperature to 230°C. Then the reaction system allowed a saturated steam to be blown thereinto to remove the still remaining solvent and low polymers produced by said polymerization. The steam distillation was discontinued when the outcoming distillate had been confirmed to contain no or very little oily layer, after which the melt residue was recovered on an aluminum tray and allowed to cool thereby obtaining a light yellow-colored resinous material. The formation of a gel-like material was not appreciated during said polymerization, and the separation and removal of the remaining catalyst were successfully effected without trouble.

Table 1

| Feed | Ingredient | (%) | Ratio of monoolefins* to total monomers (%) | Ratio of conjugated diolefins to total monomers (%) |
|---|---|---|---|---|
| A | 1,3-pentadiene | 58.6 | 34.7 | 65.3 |
| | Cyclopentene | 13.2 | | |
| | Diisobutylene | 17.9 | | |
| | Other unsaturated hydrocarbons having 5 – 6 carbon atoms | 4.7 | | |
| | Saturated hydrocarbons having 5 – 6 carbon atoms | 5.6 | | |
| | Total | 100.0 | | |
| B | Isoprene | 100.0 | 0 | 100 |
| Starting oil composition (A + B) | 1,3-pentadiene | 30.8 | 17.4 | 82.6 |
| | Isoprene | 47.3 | | |
| | Cyclopentene | 7.0 | | |
| | Diisobutylene | 9.4 | | |
| | Other unsaturated hydrocarbons having 5 – 6 carbon atoms | 2.5 | | |
| | Saturated hydrocarbons having 5 – 6 carbon atoms | 3.0 | | |
| | Total | 100.0 | | |

*The term "monomers" used herein is intended to refer to 1,3-pentadiene, cyclopentene, diisobutylene and isoprene.

COMPARATIVE EXAMPLE 1

The procedure of Example 1 was followed with the exception that a starting oil composition having entirely the same composition as indicated in Example 1 was fed to the reaction system without being previously divided into two portions, thereby to obtain a light yellow-colored product. In this case, a gel-like material was produced in a considerable amount and, therefore, the catalyst residue was very difficult to remove.

EXAMPLE 2

A 3-liter glass flask was charged with 1300 g of a mixed solvent consisting of 80 parts of benzene and 20 parts of toluene and with 7.0 g of aluminum chloride to form a mixture which was agitated at 45°C for 10 minutes and then incorporated slowly and continuously with two feed portions of 700 g in total of a monomeric mixture over a period of 120 minutes. More particularly, said incorporation of the monomeric mixture into the glass flask was effected in such a manner that one porton of the monomeric mixture having the composition A as shown in Table 2 and containing 50 percent of the total monomers to be added was initially added and, after completion of this initial addition, the other portion containing 50 percent of the total monomers as shown at B in Table 2 was added to the reaction system. The reaction system was kept at 55°C during the addition of these portions, after which the reaction mixture was further stirred for 30 minutes and then incorporated with 28 ml of the same neutralizing agent as used in Example 1 thereby decomposing the used aluminum chloride. The reaction mixture was further treated in quite the same manner as in Example 1 thereby to obtain a light yellow-colored product. In this Example, gel formation was not appreciated and removal of the catalyst residue was therefore effected easily.

Table 2

| Composition | Ingredient | (%) | Ratio of monoolefins to total monomers (%) | Ratio of conjugated diolefins to total monomers (%) |
|---|---|---|---|---|
| A | Isoprene | 76.0 | 24.0 | 76.0 |
|  | α-methylstyrene | 24.0 |  |  |
|  | Total | 100.0 |  |  |
| B | Isoprene | 100.0 | 0 | 100 |
| Total monomeric mixture (A+B) | Isoprene | 88.0 | 12.0 | 88.0 |
|  | α-methylstyrene | 12.0 |  |  |
|  | Total | 100.0 |  |  |

REFERENCE EXAMPLE 2

The procedure of Example 2 was followed except that the same feed portions as used in Example 2 were added in admixture to the system without keeping them in two portions which were different in composition, with the result that gel-like substances were produced in remarkable amounts thereby making it impossible to separate the catalyst residue from the reaction mixture.

Table 3 shows the yield, softening points and melt viscosities of the resins produced, and the amounts of gel-like materials formed in Examples 1 to 2 and Comparative examples 1 to 2.

Table 3

|  | *1 Yield (%) | *2 Softening point (°C) | *3 melt viscosity (cps) | *4 Amount of gel formed (%) |
|---|---|---|---|---|
| Example 1 | 88.5 | 127.0 | 1960 | 0 |
| Com. Ex. 1 | 85.0 | 129.5 | 3430 | 2.5 |
| Example 2 | 82.5 | 130.5 | 2860 | 0 |

Table 3-continued

|  | *1 Yield (%) | *2 Softening point (°C) | *3 melt viscosity (cps) | *4 Amount of gel formed (%) |
|---|---|---|---|---|
| Com. Ex. 2 | — | — | — | Large amount |

Note:
Com. Ex. = Comparative Example
*1 : Yield = Ratio (%) of weight of resin produced to total weight of diolefins and monoolefins contained in monomeric mixture used, the diolefins and monoolefins being among 1,3-pentadiene, cyclopentene, diisobutylene, isoprene and α-methylstyrene.
*2 : Softening point, measured by the ring and ball method prescribed in JIS (Japanese Industrial Standard) K-2531.
*3 : Melt viscosity, measured at 220°C by a Brookfield type viscosimeter.
*4 : Amount of gel formed = Ratio (%) of weight of gel formed to total weight of diolefins and monoolefins contained in monomeric mixture used, the olefins being among 1,3-pentadiene, cyclopentene, diisobutylene, isoprene and α-methylstyrene.

As is seen from Table 3, a starting oil composition wherein a large proportion of the monomers is conjugated diolefins will inevitably produce gel-like materials as a by-product if it is subjected to a conventional polymerization process and, on the other hand, it will produce a resin of a high softening point while inhibiting the side reaction of forming gel-like substances if it is subjected to the two-step polymerization process of this invention. It is also clear that the process of this invention is capable of preventing the resulting desired resin from remarkably increasing in melt viscosity due to the incorporation of the desired resin with minute gel-like substances or high molecular polymers which are otherwise produced.

EXAMPLES 3 – 5

In each of these Examples, a 3-liter glass flask were charged with 8.3 g of aluminum chloride and 1203 g of a mixed solvent consisting of benzene and toluene in the ratio of 80 parts : 20 parts to form a mixture which was stirred at 35°C for 10 minutes and then incorporated slowly and continuously with two hydrocarbon portions respectively having different compositions over a period of time of 120 minutes, the total amount of which portions was 767 g including 690 g of monomers. More particularly, said incorporation with two hydrocarbon portions was effected in such a manner that one hydrocarbon portion having the composition A as indicated in Table 4 was initially incorporated in the reaction system and, after completion of this initial incorporation, the other portion having the composition B as indicated in Table 4 was successively incorporated in the system. Table 5 indicates the ratios (%) of the monoolefins or diolefins to the total monomers in each of the hydrocarbon portions respectively having the compositions A and B, and the starting oil composition (consisting of the two hydrocarbon portions), in each of Examples 3 – 5.

The reaction system was kept at 45°C during the incorporation of the starting oil composition therein, after which the system so incorporated was further agitated for 30 minutes and then mixed with 33 ml of the same neutralizing agent as use in Example 1 thereby to decompose the aluminum chloride. The reaction mixture was subsequently treated in the same manner as mentioned in Example, thus obtaining a light yellow-colored resinous product. In these Examples, gel-like materials were not found to be produced and the catalyst residue was therefore easily separated from the reaction mixture.

EXAMPLE 6

The procedure of Example 4 was followed except that a 3-liter glass flask was charged with 10.4 g of aluminum chloride and the solvent to form a mixture which was stirred at 45°C for 10 minutes, incorporated with the starting oil composition at 55°C and then neutralized with 42 ml of a neutralizing agent, thereby obtaining a yellow-colored resinous product. In this Example, gel-like materials were not found to be produced and the used catalyst was therefore separated easily.

REFERENCE EXAMPLE 3

The procedure of Examples 3 – 5 was followed with the exception that the same feed portions were fed in Table 4

| | Ingredient | Example 3 Feed portion (%) | Example 3 Ratio (%) to total monomers contained in starting oil composition | Example 4 Feed portion (%) | Example 4 Ratio (%) to total monomers contained in starting oil composition | Example 5 Feed portion (%) | Example 5 Ratio (%) to total monomers contained in starting oil composition |
|---|---|---|---|---|---|---|---|
| A | 1,3-pentadiene | 49.8 | 16.2 | 59.0 | 32.4 | 62.7 | 48.6 |
| | Cyclopentene | 11.8 | 3.8 | 13.9 | 7.6 | 14.8 | 11.4 |
| | Diisobutylene | 30.8 | 10.0 | 18.2 | 10.0 | 12.9 | 10.0 |
| | Unsaturated hydrocarbons having 5–6 carbon atoms | 2.3 | | 2.7 | | 2.9 | |
| | Saturated hydrocarbons having 5–6 carbon atoms | 5.3 | | 6.3 | | 6.7 | |
| | Total | 100.0 | 30.0 | 100.0 | 50.0 | 100.0 | 70.0 |
| B | 1,3-pentadiene | 72.0 | 56.5 | 72.0 | 40.4 | 72.0 | 24.2 |
| | Cyclopentene | 17.0 | 13.5 | 17.0 | 9.6 | 17.0 | 5.8 |
| | Diisobutylene | 0 | 0 | 0 | 0 | 0 | 0 |
| | Unsaturated hydrocarbons having 5–6 carbon atoms | 3.3 | | 3.3 | | 3.3 | |
| | Saturated hydrocarbons having 5–6 carbon atoms | 7.7 | | 7.7 | | 7.7 | |
| | Total | 100.0 | 70.0 | 100.0 | 50.0 | 100.0 | 30.0 |
| Starting oil composition (A + B) | 1,3-pentadiene | 65.6 | 72.8 | 65.6 | 72.8 | 65.6 | 72.8 |
| | Cyclopentene | 15.4 | 17.2 | 15.4 | 17.2 | 15.4 | 17.2 |
| | Diisobutylene | 9.0 | 10.0 | 9.0 | 10.0 | 9.0 | 10.0 |
| | Unsaturated hydrocarbons having 5–6 carbon atoms | 3.0 | | 3.0 | | 3.0 | |
| | Saturated hydrocarbons having 5–6 carbon atoms | 7.0 | | 7.0 | | 7.0 | |
| | Total | 100.0 | 100.0 | 100.0 | 100.0 | 100.0 | 100.0 |

*The expression "total monomers" used in this Table is intended to mean "the total of 1,3-pentadiene, cyclopentene and diisobutylene".

Table 5

| | Example 3 Ratio (%) of monoolefins to total monomers | Example 3 Ratio (%) of conjugated diolefins to total monomers | Example 4 Ratio (%) of monoolefins to total monomers | Example 4 Ratio (%) of conjugated diolefins to total monomers | Example 5 Ratios (%) of monoolefins to total monomers | Example 5 Ratios (%) of conjugated diolefins to total monomers |
|---|---|---|---|---|---|---|
| A | 46.1 | 53.9 | 35.2 | 64.8 | 30.6 | 69.4 |
| B | 19.1 | 80.9 | 19.1 | 80.9 | 19.1 | 80.9 |
| Starting oil composition (A + B) | 27.2 | 72.8 | 27.2 | 72.8 | 27.2 | 72.8 | admixture to the reaction system without keeping them in the original two portions which were different in composition from each other, thus obtaining a light yellow-colored resinous product. In this case, gel-like substances were not found to be produced and the used catalyst was easily separated accordingly.

Table 6 shows the yields, softening points, cloud points and melt viscosities of the resinous products obtained in Examples 3 – 6 and Reference example 3. The cloud points are an indication showing compatibility of petroleum resins with ethylene-vinyl acetate copolymers, the compatibility being the most fundamental property required in petroleum resins to allow them to be used as one of the components for hot melt adhesives. The lower the cloud point of the resinous product is, the more excellent the compatibility thereof is. The resinous products will provide hot melt adhesive compositions with suppleness when contained in the compositions.

Table 6

|  | * Yield (%) | Softening point (°C) | *2 Melt viscosity (centipoise) | *3 Cloud point (°C) |
| --- | --- | --- | --- | --- |
| Example 3 | 81.4 | 91.2 | 700 | 136 |
| Example 4 | 85.0 | 102.5 | 2120 | 165 |
| Example 5 | 85.1 | 103.0 | 2400 | 183 |
| Example 6 | 85.3 | 104.5 | 2220 | 147 |
| Reference example 3 | 85.6 | 104.8 | 2980 | >200 |

*1 Yield = Ratio (%) of amount of resin produced to total amount of 1,3-pentadiene, cyclopentene and diisobutylene.
*2 Melt viscosity, measured at 180°C by a Brookfield type viscosimeter.
*3 Cloud point, measured by the process prescribed in JIS (Japanese Industrial Standard) K-2266. Test samples consisted of the resin, an ethylenevinyl acetate copolymer*4 and paraffin wax*5 in the ratio of 1 : 1 : 1.
*4 Supplied under the trademark of "EVAFLEX No. 210" by Mitsui Polychemical Co., Ltd. The copolymer contained 28% of vinyl acetate and had a melt index of 400 g/min. (ASTM D-12238 Amended)
*5 Supplied under the trademark "PARAFFIN WAX SP 45" by Nippon Sciro Co., Ltd. Melting point 145°F (JIS K-2521)

As is indicated in Table 6, the process of this invention when practiced will not only be effective in inhibiting the formation of gel-like substances but also give resinous products having a lowered melt viscosity and an increased compatibility with ethylene-vinyl acetate copolymers. These effects or advantages of the process of this invention will allow the petroleum resins produced thereby to be used very advantageously for industrial purposes.

In the practice of this invention, with the increase in content of monoolefins present in the first feed portion to be fed in the first step of polymerization the resulting resins will have a lower melt viscosity and better compatibility with an ethylene-vinyl acetate copolymer while they will have a lower softening point and be obtained in a lower yield. It is therefore to be understood that the portion of the starting oil composition to be fed in the first step should be limited in composition to within a suitable range.

What is claimed is:

1. In a process for producing a petroleum resin by providing a starting oil composition comprising chain conjugated diolefins having 4 to 5 carbon atoms and monoolefinic unsaturated hydrocarbons having 4 to 10 carbon atoms and being copolymerizable with said conjugated diolefin and cationically polymerizing the starting oil composition in the presence of a Friedel-Crafts type catalyst, said process comprising the steps of:

providing (I) a first feed portion comprising at least one of the chain conjugated diolefins and at least one of the monoolefinic unsaturated hydrocarbons in a proportion of from 20 to 80% by weight of the monomers contained in the first portion and (II) a second feed portion comprising at least one of the chain conjugated diolefins and, if desired, at least one of the monoolefinic unsaturated hydrocarbons in a proportion, which is less than said proportion in the first feed portion, by weight of the monomers contained in the second feed portion, the starting oil composition consisting essentially of the first and second feed portions (I) and (II), polymerizing the first feed portion (I) in a first step and successively polymerizing in a second step the second feed portion (II) in the presence of the resulting reaction mixture from the first step, thereby obtaining a petroleum resin having a low melt viscosity and satisfactory compatibility.

2. A process according to claim 1, wherein the proportion of the monoolefinic unsaturated hydrocarbons contained in the first feed portion is 20 – 65 percent by weight.

3. A process according to claim 1, wherein the second feed portion contains the monoolefinic unsaturated hydrocarbons in less proportions than the first feed portion by at least 5 percent by weight.

4. A process according to claim 1, wherein the first feed portion contains 20 – 80 percent by weight of the total monomers contained in the first and second feed portions and the second feed portion 80 – 20 percent by weight thereof.

5. A process according to claim 1, wherein the first feed portion contains 30 – 70 percent by weight of the total monomers and the second feed portion 70 – 30 percent by weight thereof.

6. A process according to claiam 1, wherein the starting oil composition contains the monoolefinic hydrocarbons in amounts of 5 – 65 percent by weight of the total monomers contained in the composition.

7. A process according to claim 1, wherein the starting oil composition contains the monoolefinic hydrocarbons in amounts of 10 – 60 percent by weight of the total monomers contained in the composition.

8. A process according to claim 1, wherein the polymerization in the first step is effected in a first polymerization reactor and the polymerization in the second step in a second polymerization reactor, the first and second reactors being connected in series to each other.

9. A process according to claim 1, wherein the chain conjugated diolefins are 1,3-pentadiene, isoprene and 1,3-butadiene.

10. A process according to claim 1, wherein the monoolefinic unsaturated hydrocarbons are butene-1, isobutylene, pentene-1, 2-methylbutene-2, hexene-1, 2,4,4-trimethylpentene-1, 2,4,4-trimethylpentene-2, cyclopentene, cyclohexene, styrene and α-methylstyrene.

11. A process according to claim 1, wherein the monoolefinic unsaturated hydrocarbons are cyclopentene, diisobutylene and α-methylstyrene.

12. A process according to claim 1, wherein the polymerizations of the first and second feed portions (I) and (II) are respectively effected in the presence of a Friedel-Crafts type catalyst selected from the group consisting of fluorides, chlorides, bromides and iodides of aluminum, boron and iron.

13. A process according to claim 1, wherein the polymerizations of the first and second feed portions (I) and (II) are respectively effected in a solvent selected from the group consisting of benzene, toluene, xylene, pentane, hexane, heptane and cyclohexane.

14. A process according to claim 1, wherein the polymerizations of the first and second feed portions (I) and (II) are respectively effected in a solvent containing at least two hydrocarbons selected from the group consisting of benzene, toluene, xylene, pentane, hexane, heptane, and cyclohexane, in such amounts that the solvent contains not less than 50 percent by weight of at least one of the aromatic hydrocarbons.

15. A process according to claim 1, wherein the polymerizations of the first and second feed portions (I) and (II) are respectively effected at temperatures of from −20° to +100°C.

* * * * *